US010234071B2

(12) United States Patent
Bosnakovic

(10) Patent No.: US 10,234,071 B2
(45) Date of Patent: Mar. 19, 2019

(54) STAND SELECTIVELY USEABLE AS A MONOPOD OR A TRIPOD

(71) Applicant: Denny Manufacturing Company, Inc., Mobile, AL (US)

(72) Inventor: Frederick Bosnakovic, Uniontown, OH (US)

(73) Assignee: Denny Manufacturing Company, Inc., Mobile, AL (US)

( * ) Notice: Subject to any disclaimer, the term of this patent is extended or adjusted under 35 U.S.C. 154(b) by 0 days.

(21) Appl. No.: 15/490,543

(22) Filed: Apr. 18, 2017

(65) Prior Publication Data

US 2018/0080601 A1 Mar. 22, 2018

Related U.S. Application Data

(60) Provisional application No. 62/495,507, filed on Sep. 16, 2016.

(51) Int. Cl.
| F16M 13/00 | (2006.01) |
| F16M 11/34 | (2006.01) |
| F16M 11/30 | (2006.01) |
| F16M 11/20 | (2006.01) |
| F16M 11/04 | (2006.01) |
| G03B 17/56 | (2006.01) |

(52) U.S. Cl.
CPC ............ *F16M 11/34* (2013.01); *F16M 11/04* (2013.01); *F16M 11/2014* (2013.01); *F16M 11/30* (2013.01); *G03B 17/561* (2013.01)

(58) Field of Classification Search
CPC .... F16M 11/34; F16M 11/04; F16M 11/2014; F16M 11/30; G03B 17/561
USPC ...... 248/558, 163.1, 165, 166, 168, 169, 171
See application file for complete search history.

(56) References Cited

U.S. PATENT DOCUMENTS

| 5,934,628 A * | 8/1999 | Bosnakovic | B60Q 7/00 248/169 |
| 6,454,228 B1 * | 9/2002 | Bosnakovic | B60Q 7/00 248/169 |
| 8,733,713 B1 * | 5/2014 | Leysock | F16M 11/245 248/169 |
| 9,908,465 B2 * | 3/2018 | Allison | B60Q 7/00 |

* cited by examiner

*Primary Examiner* — Todd M Epps
(74) *Attorney, Agent, or Firm* — Sand, Sebolt & Wernow Co., LPA

(57) ABSTRACT

A dual-purpose stand and method for supporting photographic equipment is disclosed. The stand is able to be used as a monopod or a tripod. A retaining device is provided on the stand. The retaining device is selectively engaged to lock a leg assembly provided on the stand in a collapsed or closed position when the stand is to be used as a monopod. The retaining device is disengaged when the stand is to be used as a tripod. When the retaining device is disengaged, the stand will automatically become a tripod when placed on a support surface. The stand's legs will automatically move to an extended or open position when the stand is set down on the support surface and the legs will automatically move back to a collapsed or closed position when the stand is lifted from the support surface.

22 Claims, 12 Drawing Sheets

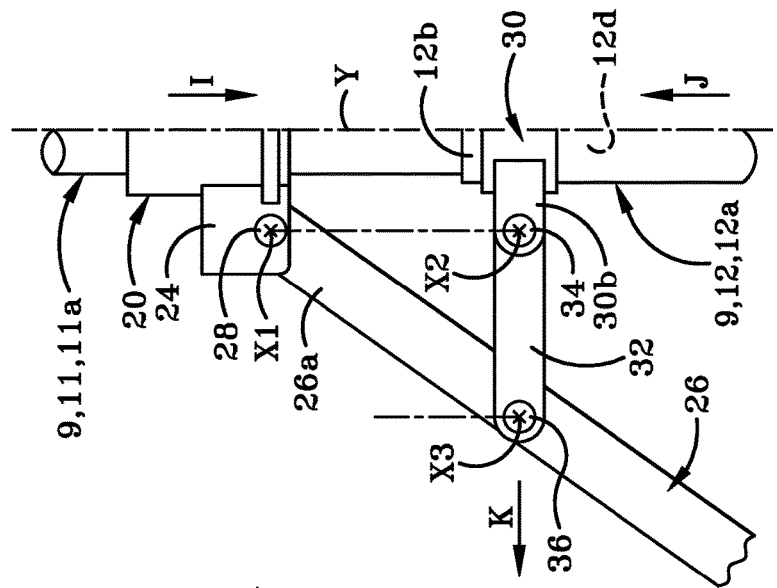
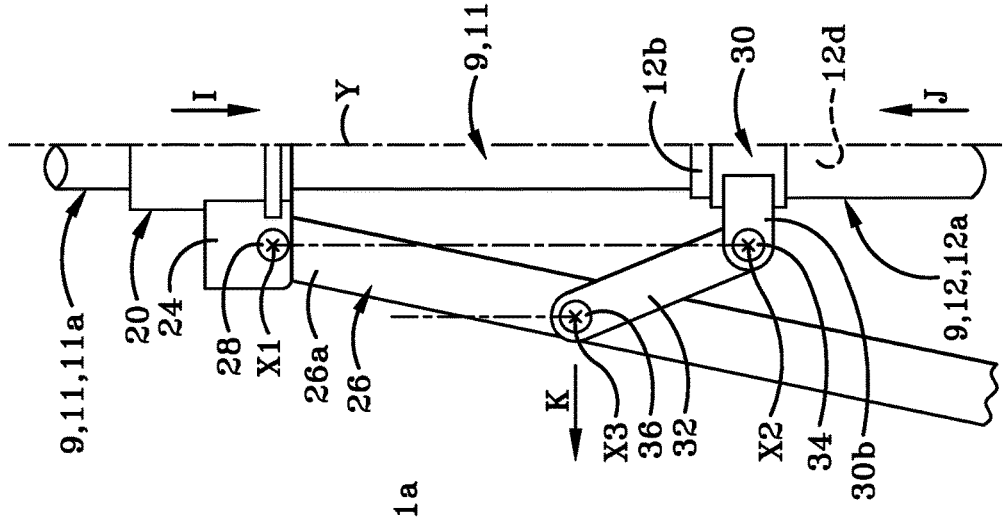
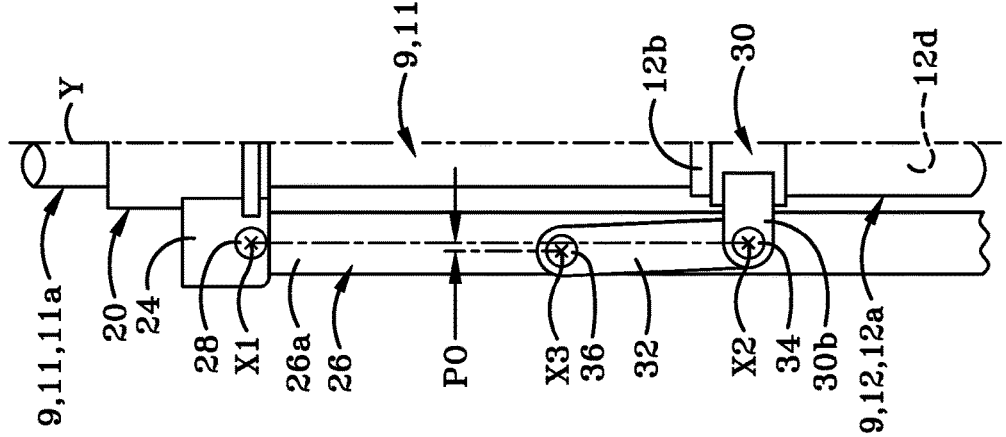

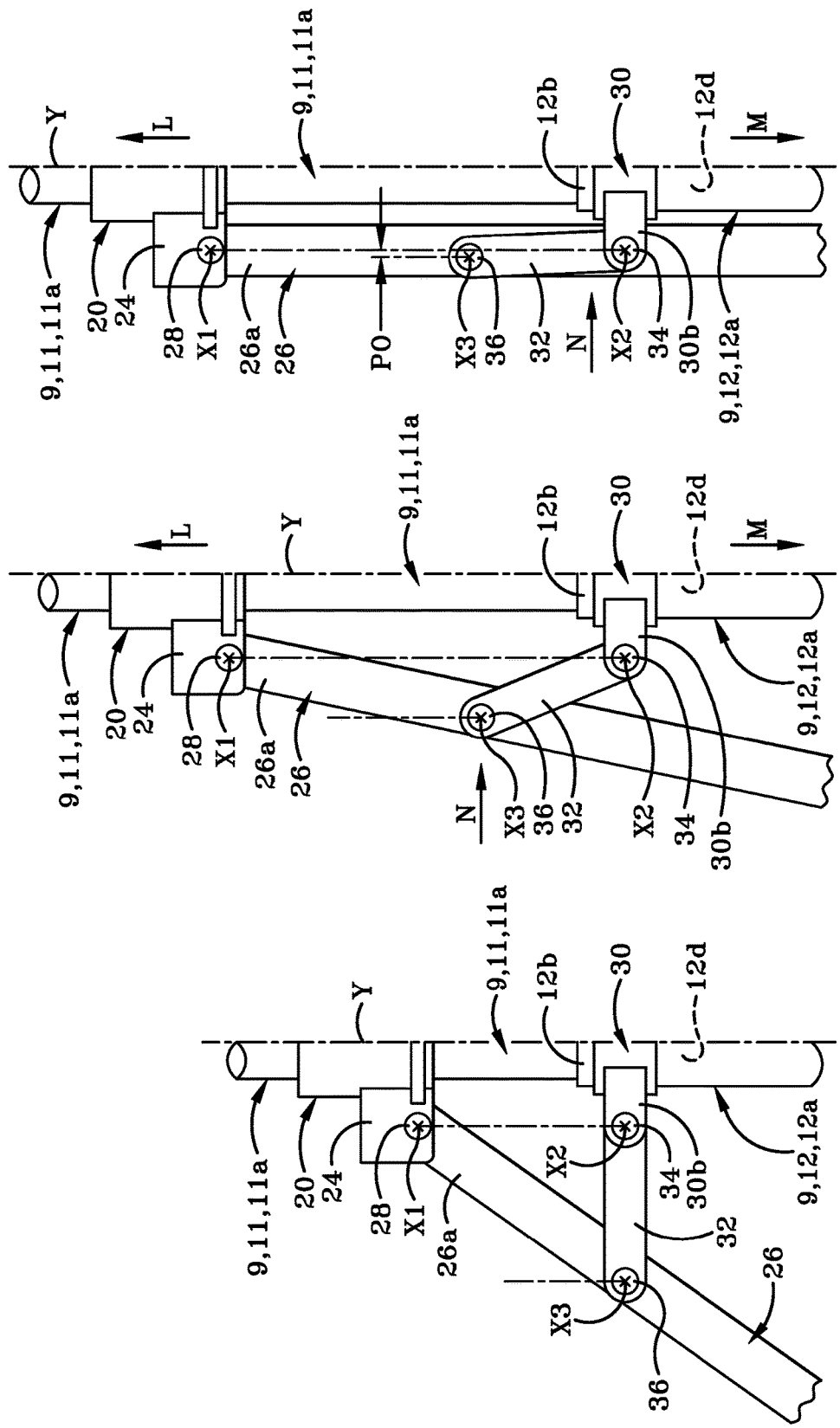

STAND SELECTIVELY USEABLE AS A MONOPOD OR A TRIPOD

CROSS REFERENCE TO RELATED APPLICATIONS

This application claims the benefit of U.S. Provisional Application Ser. No. 62/495,507, filed on Sep. 16, 2016, the entire disclosure of which is incorporated herein by reference.

BACKGROUND OF THE INVENTION

Technical Field

The present invention is directed generally to photographic equipment. More particularly, the present invention relates to a stand for supporting equipment such as a camera or a light in a stable position during use. Specifically, the present invention is a dual-purpose stand that is able to be used as a monopod or as a tripod. The stand includes a retaining device that is selectively engaged to lock the stand in a monopod position and is selectively disengaged to allow the stand to be used as a tripod. After disengagement of the retaining device the stand's legs will automatically open to the tripod position when the stand is set down on a support surface and the legs will automatically close when the stand is lifted from the support surface.

Background Information

Photographers frequently wish to hold their photographic equipment in a stable position so that they can take a good photograph. The most basic way of accomplishing this is by simply placing the photographic equipment, such as a camera, onto a flat surface and then taking the shot. In many instances, however, suitable flat surfaces may not be available in a particular location. To resolve this issue, a variety of different equipment stands have been developed to provide a portable support to photographers and videographers. The most common of these stands is known as a tripod. Tripods have three legs that can be moved between a collapsed position and an extended position. In the collapsed position the legs are all positioned substantially parallel to each other. In the extended position the legs are spread apart so that the bottom ends thereof are spaced a distance away from each other. The legs will then be locked in place. The contact of the three legs with the ground provides a stable support. In some instances, the legs will each be selectively adjustable in length so that the photographer can attempt to position his or her camera generally horizontally even if the ground is uneven. A tripod is provided with a connector at one end to which a camera or another piece of equipment may be engaged. The photographer will engage his or her camera with the connector and will then take his or her shot. Tripods are extremely helpful to a photographer or videographer as he or she can lift their hands completely from the camera and the stand in order to make adjustments to their equipment, fix lighting, take a break or perform other tasks. The tripod will keep the camera in a stable position while these adjustments and other tasks are being performed. The freedom to move quickly and easily from one location to another is not possible with tripods as the entire tripod has to be lifted off the ground and repositioned. Tripods can be quite bulky and heavy. Additionally, the locked and spread apart legs tend to make the device unwieldy and difficult to maneuver around objects. Consequently, the photographer will frequently have to disengage and collapse individual legs to move a tripod from one location to another.

Another type of camera stand that has been developed is known as a monopod. Monopods have a single leg that contacts the ground and have a connector at an opposite end for securing a camera thereto. Monopods, because they only have a single leg, tend to be unstable and cannot stand on a support surface on their own. Consequently, a photographer or videographer has to continuously hold onto the camera or monopod or they have to lay the monopod flat on a surface if they need to go and fix lighting or perform some other task. When the photographer holds the camera and places the end of the monopod's leg on the ground, the monopod will steady the camera for a shot. Monopods give the photographer the freedom to rapidly rotate the camera from one position to another because while the monopod is resting on the ground, the monopod is able to rotate about an axis that extends along the device's length. Monopods also allow the photographer the freedom to readily and rapidly move from one location to another. However, if the photographer has to work for a sustained period of time, continuously holding on to the monopod or the camera, this can become extremely tiring. It is also difficult for the photographer to make adjustments to their equipment without laying the stand and the equipment down on the support surface or without disengaging their equipment from the monopod.

It is evident therefore that having both a tripod and a monopod is advantageous for a photographer. However, both of these devices are fairly cumbersome and, consequently, a photographer may opt to carry only one of these two types of stands to a shoot.

SUMMARY

There is therefore a need in the art for an improved equipment stand that will provide a stable platform for supporting a camera or lighting equipment and that can offer hand's free operation if desired but which will also allow the photographer to rapidly change shooting angles if desired or required.

The stand disclosed herein addresses many of the shortcomings of the prior art. The disclosed stand may be particularly useful for sports photographers or wedding photographers who need to be mobile and able to quickly move their equipment from one position to another or one aspect to another; and who may wish to switch between using a monopod and a tripod to take different types of shots.

The stand disclosed herein may further be useful for a photographer or videographer who typically uses a monopod for mobility and ease of use but who would appreciate being able to have a break from holding their equipment when not actively working or while adjusting their equipment.

Instead of having to use two separate stands, the presently disclosed stand allows the photographer or videographer to use a single stand that may be quickly and easily converted between a monopod and a tripod. The presently disclosed stand offers the photographer or videographer the advantage of not having to continuously hold on to a monopod because he or she can simply disengage a retaining device provided on the stand and then place the stand on a support surface. A leg assembly on the stand will automatically open up and move to a tripod position when the stand is placed onto the support surface. When the photographer wishes to move, he or she will simply pick up the stand and the leg assembly will automatically close. If the stand is to be used as a tripod, it is simply placed on the support surface in the new location.

If the stand is to be used as a monopod in the new location, the retaining device is re-engaged to lock the leg assembly in the closed position.

A dual-purpose stand and method for supporting photographic equipment is disclosed herein. The stand is able to be used as a monopod or a tripod. A retaining device is provided on the stand. The retaining device is selectively engaged to lock a leg assembly provided on the stand in a collapsed or closed position when the stand is to be used as a monopod. The retaining device is disengaged when the stand is to be used as a tripod. When the retaining device is disengaged, the stand will automatically become a tripod when placed on a support surface. The stand's legs will automatically move to an extended or open position when the stand is set down on the support surface and the legs will automatically move back to a collapsed or closed position when the stand is lifted from the support surface.

In one aspect, the invention may provide a stand for supporting equipment in a stable position above a surface, said stand being movable between a first position and a second position; and when the stand is in the first position there is more than one contact point between the stand and the surface; and when the stand is in the second position there is only one contact point between the stand and the surface; wherein the stand is automatically moveable to the first position when placed in contact with the surface; and wherein the stand is prevented from moving to the first position by engaging a retaining device provided on the stand.

In another aspect, the invention may provide a stand for supporting equipment in a stable position above a surface, wherein the stand comprises a shaft having a first end and a second end; a connector provided on the first end, said connector being adapted to engage the equipment that is to be supported on the stand; a retaining device provided at the second end of the shaft; a leg assembly engaged with the shaft in a position intermediate the first end and the second end; wherein the leg assembly includes at least one leg that has a top end and a bottom end; and the top end of the at least one leg is pivotally engaged with the shaft; wherein the at least one leg is movable between a first position where the at least one leg is oriented at an angle to the shaft; and a second position where the at least one leg is oriented generally parallel to the shaft; and wherein the at least one leg is selectively engaged by the retaining device when the at least one leg is in the second position.

In another aspect, the invention may provide a method of utilizing a stand to support a piece of equipment on a support surface, said method comprising steps of selecting to use the stand in a tripod position or a monopod position; placing a lower end of the stand in a first location on the support surface when the step of selecting comprises selecting to use the stand in the tripod position; and automatically moving a leg assembly on the stand to an open position when the stand is placed on the support surface.

The step of automatically moving the leg assembly may comprise moving an upper tubular member on a shaft of the stand downwardly into a bore of a lower tubular member on the shaft under the influence of gravity. The method may further comprise selecting to move the stand to a second location on the support surface; lifting the stand off the support surface; and automatically moving the leg assembly to a closed position.

The step of automatically moving the leg assembly to the closed position may comprise sliding the lower tubular member of the shaft downwardly relative to the upper tubular member under the influence of gravity as the stand is lifted off the support surface.

The step of selecting may comprise selecting to use the stand in the monopod position; and then the method may further comprise moving the leg assembly from the open position to a closed position; and locking the leg assembly in a closed position using a retaining device. The step of locking the leg assembly comprises rotating the retaining device about a longitudinal axis of a shaft of the stand in a first direction device and capturing ends of legs of the leg assembly in retaining pockets defined in the retaining device.

The method may further comprise selecting to use the stand in the tripod position; rotating the retaining device about the longitudinal axis in a second direction; releasing the leg assembly from the retaining device; placing the stand on the support surface; and automatically moving the leg assembly to the open position under the influence of gravity.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

FIG. 10A is a diagrammatic partial side elevation of the shaft of the stand with one of the legs shown in the collapsed (or closed) position;

FIG. 10B is a diagrammatic partial side elevation of the shaft of the stand showing the forces that move the one of the legs into a partially extended position;

FIG. 10C is a diagrammatic partial side elevation of the shaft of the stand showing the forces that move the one of the legs into a fully extended (or open) position;

FIG. 11A is a diagrammatic partial side elevation of the shaft of the stand showing one of the legs in the fully extended (or open) position;

FIG. 11B is a diagrammatic partial side elevation of the shaft of the stand showing the forces that move the one of the legs into a partially collapsed position; and FIG. 11C is a diagrammatic partial side elevation of the shaft of the stand showing the forces that move the one of the legs into a fully collapsed (or closed) position.

Similar numbers refer to similar parts throughout the drawings.

DETAILED DESCRIPTION

Figure 1:
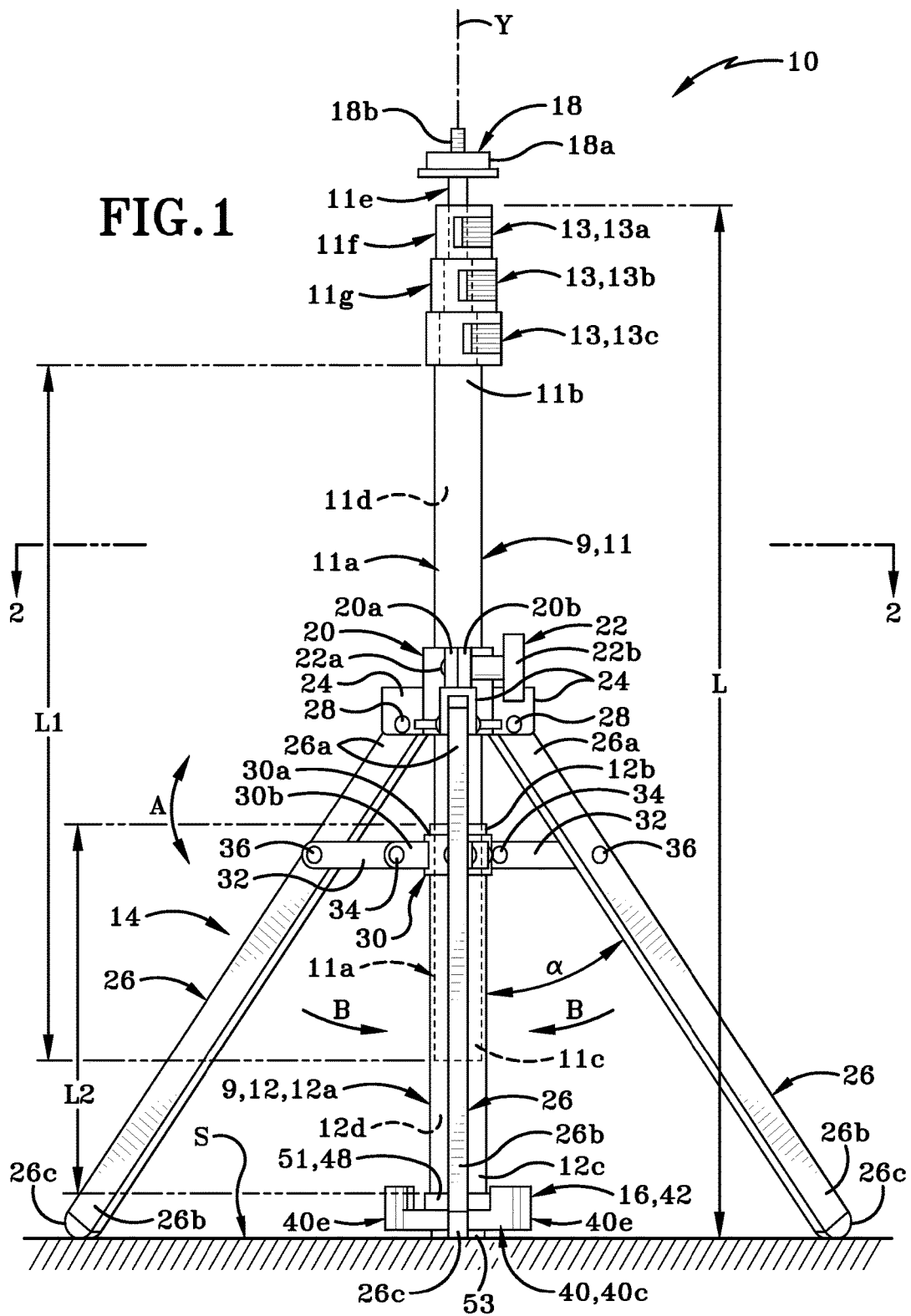
FIG. 1 is a front elevation view of a stand for equipment in accordance with an aspect of the present invention shown in a tripod position with the leg assembly thereof in an extended position and with the shaft in a generally retracted position.

Referring to FIGS. 1-9, there is shown a stand for supporting equipment, such as camera equipment, video equipment or lighting equipment, for instance. The stand in accordance with an aspect of the present invention is generally indicated at 10. Stand 10 is selectively movable between a first position (FIG. 1) where stand 10 is usable as a tripod and a second position (FIG. 9) where stand 10 is usable as a monopod. Stand 10 may comprise a shaft 9, a leg assembly 14 and a retaining device 16.

Shaft 9 may comprise an elongate tubular member made up of an upper tubular member 11 and a lower tubular member 12. Upper tubular member 11 may comprise a peripheral wall 11a having an upper end 11b, a lower end 11c, and defining a bore 11d that extends between upper end 11b and lower end 11c. Upper tubular member 11 may also comprise a first section 11e; a second section 11f and a third section 11g. First, second and third sections 11e, 11f and 11g may be telescopingly engaged with each other. Each section 11e-11g may be of a progressively greater diameter than the section above it and of a progressively lesser diameter than the section below it. Third section 11g may be telescopingly engaged with upper end 11b of wall 11a.

Lower tubular member 12 may comprise a peripheral wall 12a having an upper end 12b, a lower end 12c and defining a bore 12d that extends between upper end 12b and lower end 12d. Lower end 11c of upper tubular member 11 may be sized and shaped to be received within bore 12d of lower tubular member 12. Upper tubular member 11 may be movable in a first direction further into bore 12d and in a second direction partially out of bore 12d, as will be discussed further herein. Upper end 11b (or upper end of first segment 11e) of upper tubular member 11 may comprise a first end of shaft 9 and lower end 12c of lower tubular member 12 may comprise a second end of shaft 9. A longitudinal axis "Y" extends along shaft 9 between the first and second ends thereof.

A stop 13 may be provided at an uppermost end of each of the second section 11f, third section 11g and the upper end 11b of upper tubular member 11. For example, section 11f may include a stop 13a; section 11g may include a stop 13b and upper end 11b of peripheral wall 11a of upper tubular member 11 may include a stop 13c. Each stop 13a-13c may be of a greater diameter than the associated section 11f, 11g or peripheral wall 11a of upper tubular member 11. Each stop 13a-13c may also be of a progressively greater diameter than the stop above it and of a progressively smaller diameter than the stop below it. Stops 13 may be a type of clamping or locking device that halts relative movement between adjacent telescoping sections 11e-11g and upper end 11b of upper tubular member 11.

Figure 9:
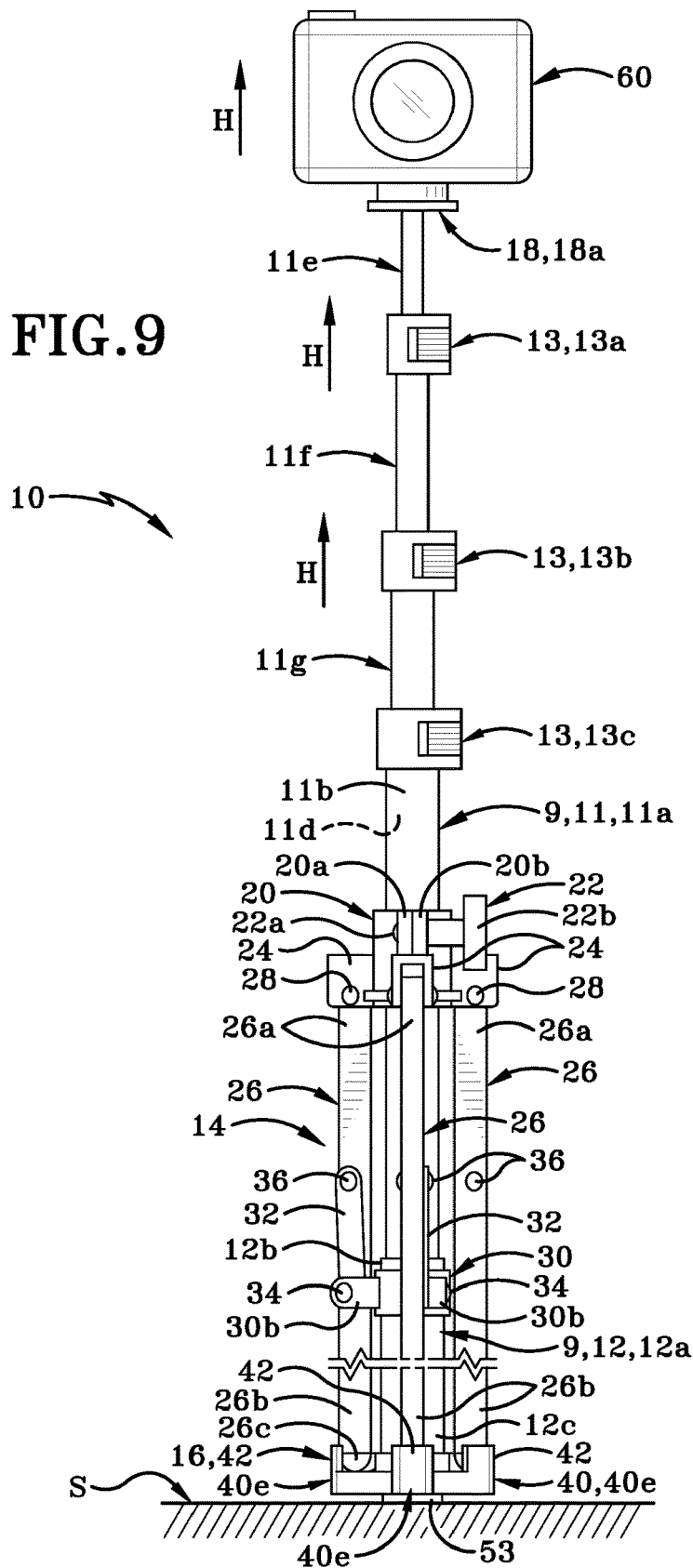
FIG. 9 is a front elevation view of the stand in the monopod position showing a camera engaged with a connector on the shaft, the shaft in a fully extended position, and the legs of the leg assembly in the collapsed position and locked by the engaged retaining device.

Shaft 9 may be of a length "L" (FIG. 1) that is measured from an uppermost end of first section 11e of upper tubular member 11 to lower end 12c of lower tubular member 12. Sections 11e, 11f, 11g may be selectively moved outwardly relative to each other and relative to the rest of peripheral wall 11a to increase the overall length "L" of shaft 10. Sections 11e, 11f, 11g may be selectively moved inwardly towards each other and relative to peripheral wall 11a to reduce the overall length "L" of shaft. FIG. 1 shows shaft 10 at its minimum length (when including telescoping sections 11e-11g) and FIG. 9 shows shaft 10 at its maximum length (when all of the telescoping sections 11e-11g have been telescoped outwardly).

It will be understood that shaft may be manufactured in such a way that it is not adjustable in length in which case sections 11e, 11f, and 11g may be omitted. It will further be understood that fewer of more sections than the illustrated sections 11e, 11f, and 11g may form part of upper tubular member 11.

Upper tubular member 11 (excluding sections 11e-11g may be of a length "L1" and lower tubular member 12 may be of a length "L2". In accordance with an aspect of the present invention, "L1" may be longer than "L2". The upper tubular member 11 may slide downwardly for a distance into bore 12d of lower tubular member under the force of gravity, thereby moving lower end 11b of upper tubular member 11 closer to lower end 12b of lower tubular member 12. Upper tubular member 11 may also slide upwardly and outwardly for a distance from bore 12d when stand 10 is lifted from a support surface "S", thereby moving lower end 11b of upper tubular member 11 away from lower end 12b of lower tubular member 12. It will be understood that upper tubular member 11 and/or lower tubular member 12 may be provided with some type of stop mechanism that prevents upper tubular member 11 from being completely disengaged from lower tubular member 12.

A connector 18 may be provided at an uppermost end of section 11 e of upper tubular member 11 or at upper end 11b of the peripheral wall 11a if sections 11e-11g are omitted from upper tubular member 11. Connector 18 may be of any configuration that enables a camera, light, light meter, reflector, background etc. to be secured to shaft 9. As illustrated in the figures, connector 18 may be of a type suitable for engaging a camera 60 (FIG. 9) on stand 10. Connector 18 may include a base 18a that is attached in any suitable manner to uppermost section 11e (or to upper end 11b of if the sections 11e-11g are omitted). A threaded fastener 18b extends upwardly from base 18a and may be provided for threaded engagement in a recess provided on an underside of camera 60.

Leg assembly 14 is engaged with shaft 9 and may comprise a sleeve 20, a plurality of legs 26, a collar 30 and a plurality of connecting links 32. Sleeve 20 may be engaged with upper tubular member 11 and be configured to move in unison with upper tubular member 11. Collar 30 may be engaged with lower tubular member 12. Legs 26 are operatively engaged with shaft 9 by way of engagements with each of the sleeve 20 and collar 30. Movement of upper tubular member 11 relative to lower tubular member 12 is what moves leg assembly 14 between an extended (or open) position shown in FIG. 1 and a collapsed (or closed) position shown in FIG. 6.

Sleeve 20 may be positioned to encircle an exterior surface of peripheral wall 11a of upper tubular member 11. Sleeve 20 may comprise two members 20a, 20b that may be generally C-shaped when viewed from above. Alternatively, sleeve 20 may comprise a single member that may be generally U-shaped when viewed from above. Sleeve 20 bounds and defines an opening 20c through which upper tubular member 11 passes. Sleeve 20 may be fixedly engaged with upper tubular member 11 by any suitable means, such as by welding or by clamping sleeve 20 onto upper tubular member 11. As illustrated herein, a clamping mechanism 22 may be provided on sleeve 20. Clamping mechanism 22 may comprise a rod 22a having a head 22b at one end. Rod 22a may be externally threaded and pass through aligned internally threaded apertures (not shown) that are defined in free ends of the C-shaped members 20a, 20b (or in the free ends of the single U-shaped member). A user may grasp head 22b and rotate rod 22a in a first direction or a second direction around an axis that extends along rod 22a. When rod 22a is rotated in a first direction the free ends of members 20a, 20b may be drawn towards each other, thereby securing sleeve 20 in a specific location along upper tubular member 11. No matter how sleeve 20 is secured to upper tubular member 11, sleeve 20 and upper tubular member 11 may be configured to move in unison.

Leg assembly 14 may further comprise one or more mounting brackets 24 provided on sleeve 20. In the particular instance illustrated in the attached figures, three mounting brackets 24 are provided on sleeve 20. Mounting brackets 24 may be spaced at regular intervals from each other around the circumference of sleeve 20. As illustrated in the figures, mounting brackets 24 may be generally equidistant from each other and adjacent mounting brackets 24 may be spaced at about 120° from each other.

Leg assembly 14 may further comprise one or more legs 26. In the example illustrated, three legs 26 are shown but it will be understood that fewer than three legs or more than three legs may be utilized in leg assembly 14. Each leg 26 may be an elongate member having a first end 26a and a second end 26b. First end 26a may be engaged with one of the mounting brackets 24 via a pivot pin 28. Pivot pin 28 permits the associated leg 26 to pivot relative to mounting bracket 24, and thereby relative to sleeve 20, about an axis "X1" (FIG. 10A) that extends along the shaft of associated pivot pin 28. The possible rotational movement of one of the legs 26 about axis "X1" is indicated in FIG. 1 by the arrow "A". Each leg 26 may be able to rotate in a similar fashion relative to its associated mounting bracket 24. Because sleeve 20 and mounting brackets 24 are fixed to upper tubular member 11, the axis "X1" remains in a substantially constant lateral position relative to longitudinal axis "Y". However, because sleeve 20 and mounting brackets 24 move in unison with upper tubular member 11, the vertical position of axis "X1" varies as leg assembly 14 is moved between the extended and collapsed positions. This is illustrated in FIGS. 10A-10C.

Second end 26b of each leg 26 may be provided with a protective boot 26c (FIG. 1) that permits leg 26b to rest on a support surface, such as surface "S" (FIGS. 1 and 9) without scratching or otherwise damaging that surface. Boot 26c also prevents second end 26b of leg 26 from being accidentally damaged by repeated contact with various surfaces and terrains as stand 10 is used.

Figure 2:
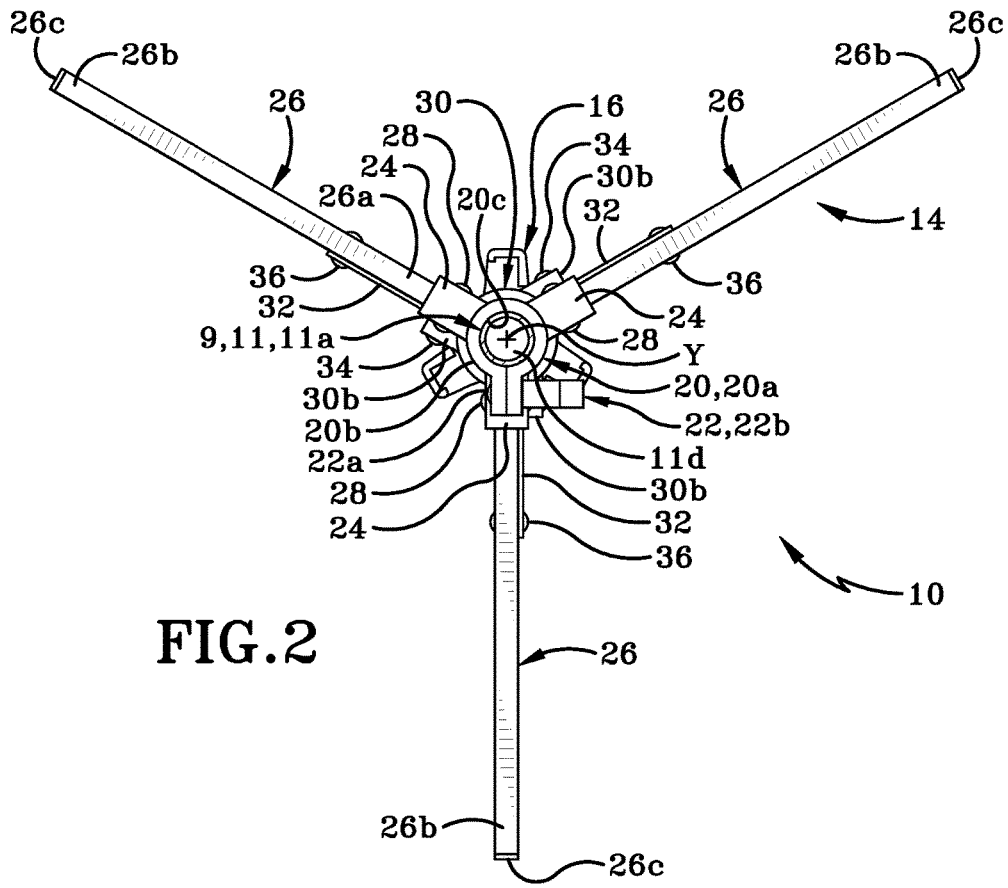
FIG. 2 is a top view thereof.
Figure 2A:
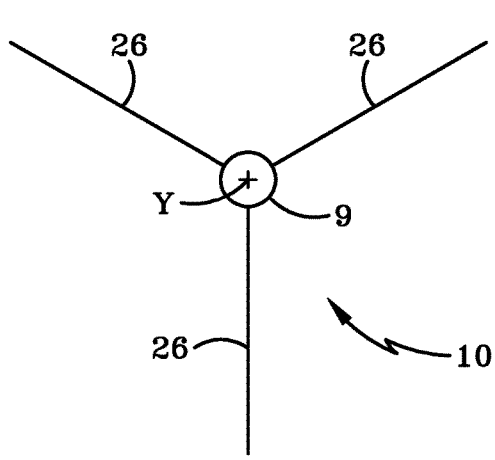
FIG. 2A is a diagrammatic top view showing a first arrangement of the legs of the stand.
Figure 2B:
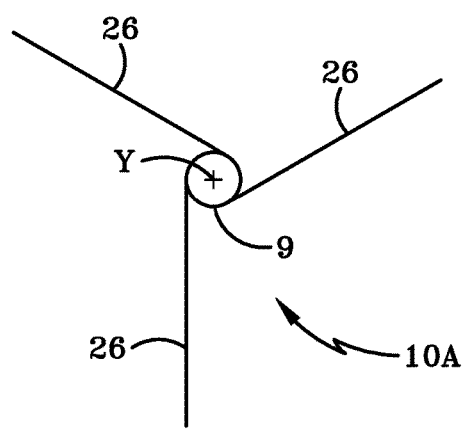
FIG. 2B is a diagrammatic top view showing a second arrangement of the legs of the stand.

FIGS. 2 and 2A show a configuration of stand 10 in which legs 26 extend radially outwardly from sleeve 20. FIG. 2B shows an alternative embodiment of a stand 10A in which legs 26A extend tangentially outwardly from sleeve 20. Any other desired configuration of legs 26 relative to sleeve 20 may be utilized in a stand according to the principles of the present disclosure.

Figure 6:
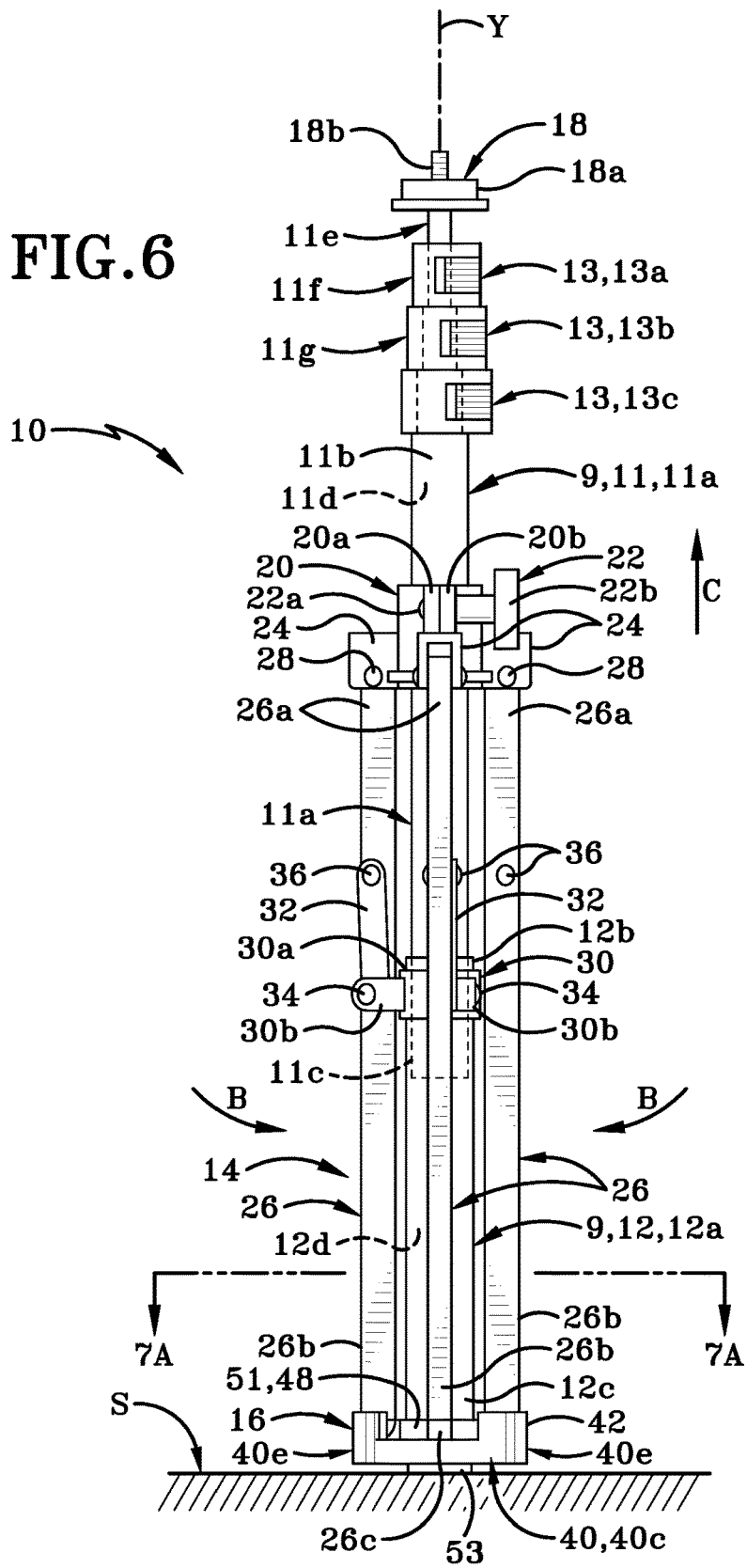
FIG. 6 is a front elevation view of the stand shown with the leg assembly thereof in a collapsed position, with the shaft thereof in a partially extended position and with the retaining device in a disengaged position.

As indicated earlier herein, leg assembly 14 may further comprise collar 30. Collar 30 may include a generally circular central region (when collar 30 is viewed from above) that bounds and defines an opening 30a through which lower tubular member 12 of shaft 9 is received. As best seen in FIG. 6, collar 30 is located proximate upper end 12b of lower tubular member 12. Collar 30 may be substantially fixed in place proximate upper end 12b of lower tubular member 12 by any suitable means such as by welding. Collar 30 may include one or more arms 30b that extend radially outwardly from an exterior circumferential surface of collar 30. In the figures, collar 30 is illustrated as having three arms 30b extending radially outwardly from the generally circular central region. The number of arms 30b provided on collar 30 may correspond to the number of legs 26 provided in leg assembly 14. The figures also show that adjacent arms 36b may be spaced generally equidistantly from each other around a circumference of the generally circular region of collar 30 Adjacent arms 36b may be located at about 120° relative to each other.

A connecting link 32 may extend between each arm 30b on collar 30 and an associated one of the legs 26. Connecting links 32 are provided to engage legs 26 with lower tubular member 12 and are part of the mechanism that permits legs 26 to automatically move between the extended and collapsed (i.e., open and closed) positions. A first end of each connecting link 32 may be pivotally secured to the associated arm 30b by a first pin 34 and a second end of each connecting link 32 may be pivotally secured to the associated leg 26 by a second pin 36. Each leg has a length measured between top end 26a and bottom end 26b/26c. Second pins 36 may be located at a position that is approximately from about one quarter to about one third of the total length away from the top end 26a thereof. Each link 32 is able to pivot about a second axis "X2" (FIG. 10A) that extends along the shaft of first pin 34 and relative to the associated arm 30b. Each link 32 is also able to pivot about a third axis "X3" (FIG. 10A) that extends along the shaft of second pin 36 and relative to the associated leg 26.

Because of the placement of collar 30, connecting links 32 are located a short distance downwardly from upper end 12b of lower tubular member 12 and therefore relatively close to sleeve 20 and brackets 24 on upper tubular member 11. The axis "X2" (FIGS. 10A-10C) of rotation of each pivot pin 34 tends to remain in a substantially constant position because collar 30 remains stationary relative to upper tubular member 11 during operation of stand 10. FIGS. 10A-10C show axis "X2" being offset from longitudinal axis "Y" and axis "X2" being located at essentially the same position vertically and laterally with respect to collar 30 and lower tubular member 12. FIG. 10A also shows that axes "X1" and "X2" may be substantially vertically aligned with each other and that axes "X1" and "X2" remain in generally the same orientation relative to each other during operation of stand 10. This can be seen in FIGS. 10A-10C.

The axis of rotation of pivot pin 36 (i.e., axis "X3") located on leg 26 may be laterally spaced from the axes "X1" and "X2" and the lateral distance between the axes varies depending on the mode of operation of stand 10, i.e., whether the stand is being used as a monopod or a tripod (see FIGS. 10A, 10B and 10C). Axis "X3" may also be vertically offset relative to axis "X2" and to axis "X1" and the vertical distances between these axes "X3", "X2" and "X3", "X1" may vary depending on the mode in which stand 10 is operating.

Additionally, pivot pins 28 and 36 are located towards an outside of each leg 26 while pivot pin 34 is located proximate peripheral wall 12a of lower tubular member 12. When stand 10 is in a monopod configuration as shown in FIG. 10A, there is a pivot offset "PO" between axes "X1" and "X2" and axis "X3" of pivot pin 36. In other words, when stand 10 is in the fully collapsed position, depicted in FIGS. 6, 9 and 10A, it should be noted that axes "X1", "X2" and "X3" are not vertically in alignment with each other. Instead, there is a small offset between axis "X3" and axes "X1" and "X2". This offset is indicted in FIG. 10A by the reference character "PO". The configuration of legs 26, with the positioning of links 32 relative to collar 30 and brackets 24, and the offset "PO" tends to bias leg assembly 14 outwardly. In other words, stand 10 is configured so that legs 26 will tend to want to move into the open or extended position. FIG. 10B shows that under the force of gravity, upper tubular member 11 moves downwardly relative to lower tubular member 12 in the direction of arrow "I". A equal and opposite force in the direction of arrow "J" is exerted by support surface "S" upon which stand 10 is placed. Because of the offset "PO" and the opposing forces "I", and "J", legs 26 tend to be moved outwardly by a force acting in the direction indicated by arrow "K" (FIG. 10B). This increases the offset between axis "X2" and the axes "X1" and "X2". The strength of the force "K" is increased by the progressively decreasing distance between axis "X1" and axis "X2". Continued movement of upper tubular member 11 downwardly in the direction of arrow "I" under the influence of gravity will continue until axis "X3" moves into lateral alignment with axis "X2". This is shown in FIG. 10C.) Consequently, when stand 10 is placed on surface "S" (FIG. 6) legs 26 will automatically move to the extended (open) position shown in FIGS. 10C and 11A. No additional external forces, springs, or other mechanisms are required to move legs 26 into the open position.

FIGS. 11A-11C show the forces involved with upper tubular member 11 is grasped and moved upwardly when stand 10 is lifted off surface "S" (FIG. 6). FIG. 11A shows axes "X3" and "X2" laterally and horizontally aligned with each other. A lifting force "L" (FIG. 11B) causes upper tubular member 11 to move upwardly away from upper end 12b of lower tubular member 12. An opposing downward force "M" due to the weight of lower tubular member 12 and leg assembly 14 and the action of gravity thereon causes lower tubular member 12 to slide downwardly relative to the upper tubular member 11 under the influence of gravity, thereby resulting in upper tubular member 11 effectively being withdrawn from bore 12d of lower tubular member 11. This movement results in an inward pulling force "N" that causes axis "X3" to move inwardly toward exterior surface of peripheral wall 11a of shaft 9. The lifting force "L" continues until axis "X3" resumes its slightly offset position "PO" when leg 26 is brought into substantially parallel arrangement with shaft 9. Consequently, when stand 10 is lifted off surface "S" (FIG. 6) legs 26 will automatically move to the collapsed (closed) position shown in FIGS. 11C and 6. No additional external forces, springs, or other mechanisms are required to move legs 26 into the closed position.

Because link 32 is located relatively close to upper end 12b of lower tubular member 12 and thereby relatively closer to sleeve 20 and mounting brackets 24, the length of links 32 (i.e., the distance from an end proximate pivot pin 36 to an end proximate pivot pin 34) dictates a distance of vertical travel of upper tubular member 11 relative to lower tubular member 12 as stand 10 opens and closes automatically. The shorter the length of links 32, the shorter the distance of vertical travel of upper tubular member 11 and the faster leg assembly 14 will move between the collapsed and extended positions.

As indicated above, leg assembly 14 may be selectively automatically movable between an extended position (FIG. 1) and a collapsed position (FIG. 9). In the collapsed position legs 26 may be drawn inwardly to be positioned proximate the exterior surface of peripheral wall 11a, 12a of shaft 9. Legs 26 in the collapsed position may be oriented generally parallel to longitudinal axis "Y". In this collapsed position, the top end 26a of each leg 26 may be spaced approximately the same lateral distance away from wall 11a, 12a of shaft 9 as is the bottom end 26b thereof. In certain instances, as will be described later herein, top end 26a of each leg may be located further outwardly away from wall 11a, 12a of shaft 9 than is the bottom end 26b thereof. The ability to move the legs 26 to the collapsed position where they are substantially parallel to longitudinal axis "Y" shaft 9 also aids in ensuring that stand 10 may be moved to a compact and manageable shape and size for moving stand 10 from one location to another.

In the extended position, legs 26 may be oriented at an angle α (FIG. 1) relative to wall 12a of lower tubular member 12 and thereby at the angle α relative to longitudinal axis "Y" of shaft 9. In the extended position, bottom end 26b of each leg 26 is spaced a greater distance laterally away from wall 12a of lower tubular member 12 than is top end 26a thereof.

All of the legs 26 of leg assembly 14 may tend to move in unison with each other when leg assembly 14 is automatically moved between the collapsed and extended positions. This occurs because the connecting links 32 connect all legs 26 to the collar 30 and because mounting brackets connect all legs 26 to sleeve 20. Consequently, if one leg 26 moves then all of the legs 26 move. The motion of legs 26 towards the exterior surface of peripheral walls 11a, 12a of shaft 9 and thereby to the closed position is indicated in FIG. 1 by the arrows "B". As leg assembly 14 moves from the extended position to the collapsed position, upper tubular member 11 tends to move longitudinally relative to lower tubular member 12 in the direction of arrow "C" (FIG. 6). As leg assembly 14 moves from the collapsed position to the extended position, i.e., legs 26 move to the open position in the direction opposite to that indicated by arrows "B"; and upper tubular member 11 tends to move longitudinally relative to lower tubular member 12 in the opposite direction to arrow "C".

In accordance with an aspect of the present invention, stand 10 also includes retaining device 16. Retaining device 16 is engaged with lower end 12c of lower tubular member 12. Retaining device 16 may be selectively engaged or disengaged by the photographer depending on how they wish to use the stand 10. Retaining device 16 may be selectively engaged to lock stand 10 in a monopod configuration. Retaining device 16 may be selectively disengaged in order to allow for automatic functioning of stand 10 as a tripod. By selecting to engage retaining device 16, the stand 10 will function as a monopod. By selecting to disengage retaining device 16, the stand 10 will function as an automatically opening and closing tripod when stand 10 is placed on a support surface "S" and removed from support surface "S", respectively.

Figure 3:
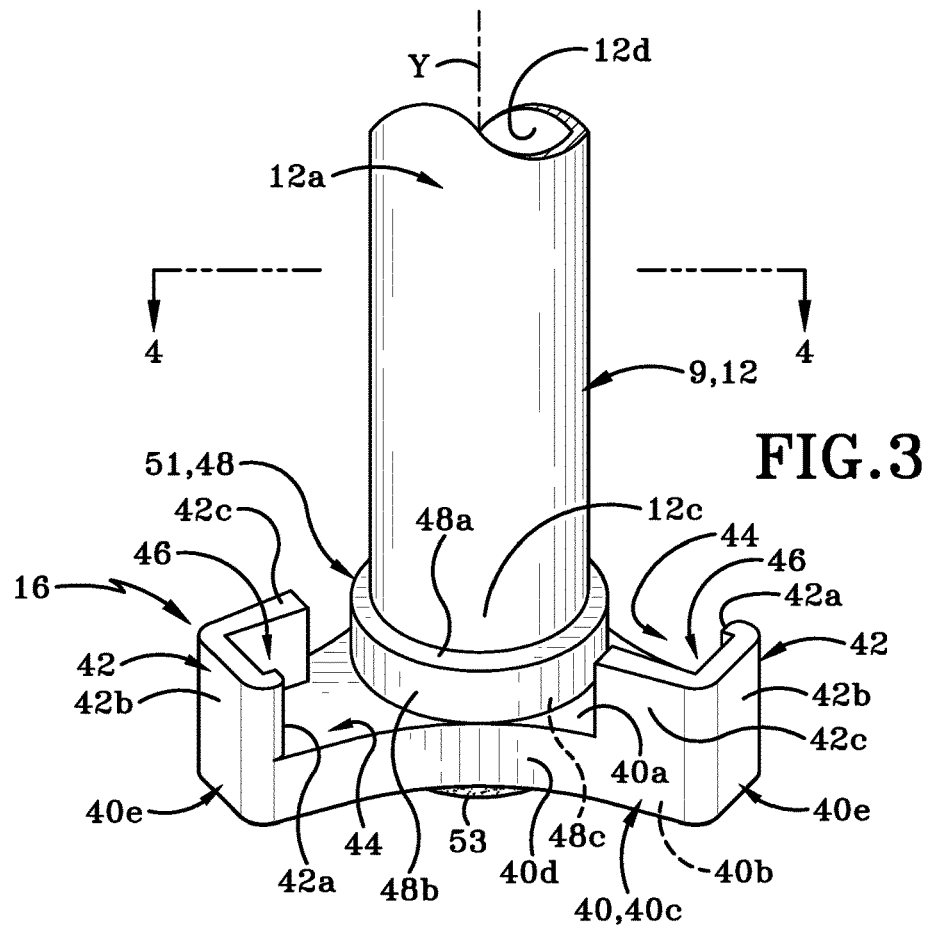
FIG. 3 is a partial perspective view of a bottom end of a shaft of the stand and a retaining device provided thereon.
Figure 4:
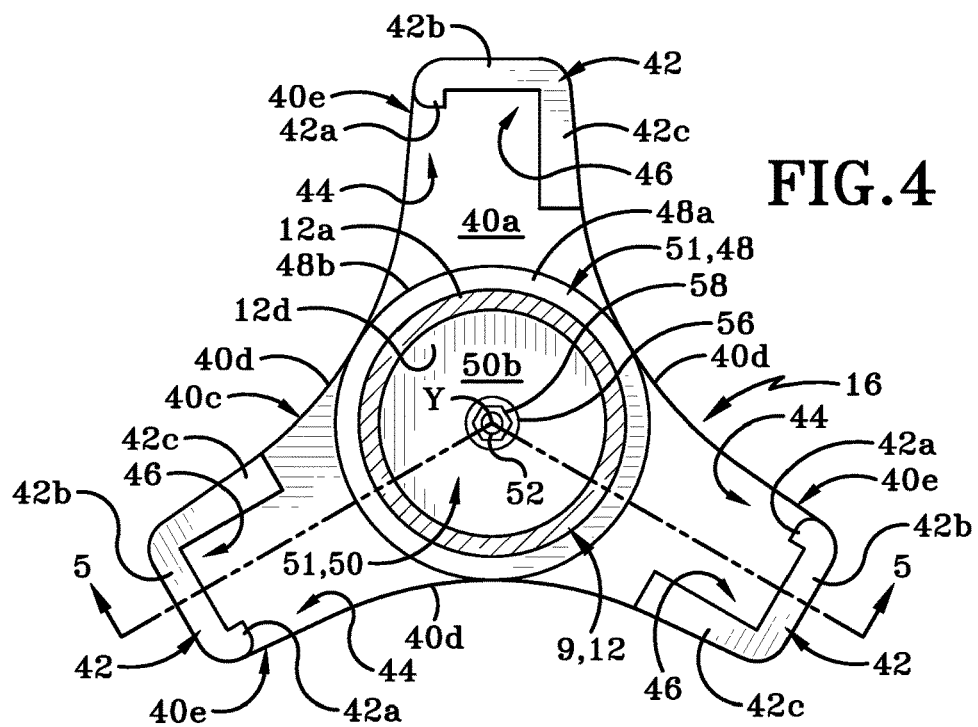
FIG. 4 is a top view taken along line 4-4 of FIG. 3.
Figure 5:
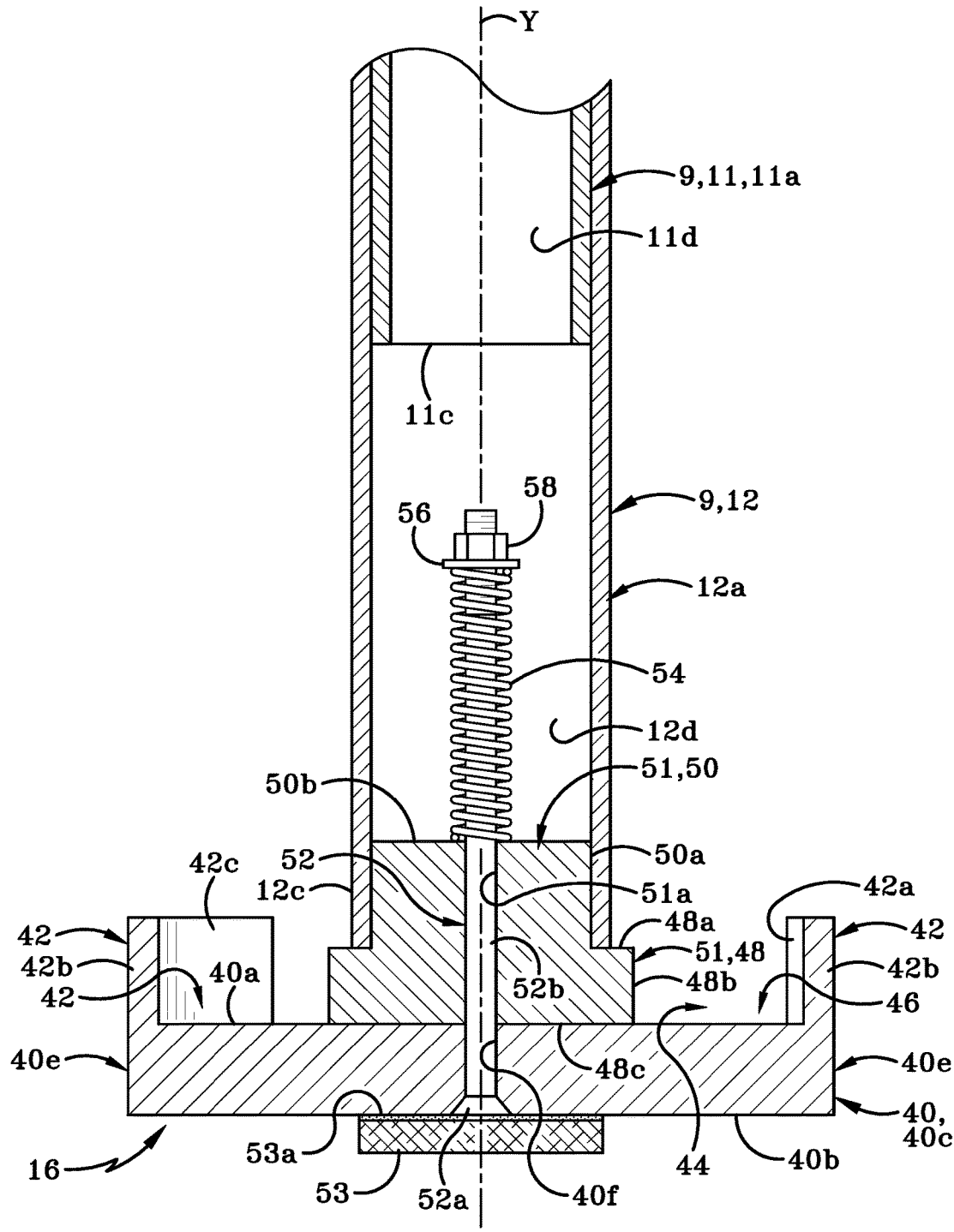
FIG. 5 is a front view taken along line 5-5 of FIG. 4.

Retaining device 16 is shown in greater detail in FIGS. 3-5. Retaining device 16 may comprise a base 40 that may be generally planar having an upper surface 40a, a lower surface 40b and a peripheral edge 40c extending between the upper and lower surfaces 40a, 40b. Retaining device 16 may define one or more scalloped regions 40d in peripheral edge 40c thereof. Each scalloped region 40d may be interposed between two adjacent arms 40e. Similarly, each arm 40e may be interposed between two adjacent scalloped regions 40d. Base 40 of retaining device 16 thus may have a scalloped appearance when viewed from above as in FIG. 4. Base 40 may be configured in such a way that the number of scalloped regions 40d and number of arms 40e corresponds to the number of legs 26 provided on leg assembly 14. Consequently, since leg assembly 14 in the attached figures includes three legs 26; base 40 has three scalloped regions 40d and three arms 40e. Base 40 may also define a central aperture 40f (FIG. 5) therein. The purpose of aperture 40f will be discussed later. Scalloped regions 40d provide the clearance necessary to permit legs 26 to readily move between the extended and collapsed positions without retaining device 16 interfering with this movement.

Retaining device 16 may also include a wall 42 that may be integrally formed with base 40. Wall 42 may extend upwardly and outwardly away from upper surface 40a of base 40 and may be oriented generally at right angles to upper surface 40a. Wall 42 may comprise an extension of peripheral edge 40c of base 40 as is illustrated in the attached figures. Wall 42 may be configured to follow the scalloped contours of peripheral edge 40c and therefore may be divided into three discrete regions; one on each arm of base 40. In each of these three discrete regions wall 42 comprises a generally L-shaped component made up of a first section 42a, a second section 42b, and a third section 42c. Each generally L-shaped region of wall 42 may be separated from an adjacent generally L-shaped region by a gap 44.

Stand 10 may further comprise an insert 51 that is at least partially engageable in bore 12d (FIG. 5) of lower tubular member 12. Insert 51 may include a bottom section 48 that is of a first diameter and an upper section 50 that is of a second and lesser diameter. The second diameter may be of a size sufficient for the upper section 50 to be received within the bore 12d of lower tubular member 12 as shown in FIG. 5. Bottom end 12c of lower tubular member 12 therefore rests upon an upper surface 48a of bottom section 48. A lower surface 48c of bottom section 48 abuts upper surface 40a of base 40. A side wall 48b of bottom section 48 extends between upper and lower surfaces 40a, 40b.

Upper section 50 of insert 51 extends upwardly and outwardly away from upper surface 48a of lower section 48. Upper section 50 has an upper surface 50a that is spaced a distance vertically above upper surface 48a and may be oriented generally parallel relative thereto. Upper section 50 may also define a side wall 50b that extends between upper surface 48a and upper surface 50a. Side wall 50b may be sized to frictionally abut an inner surface of lower tubular member 12 that defines bore 12d. Insert 50 may further comprise a central bore 50a that extends between upper surface 48a and upper surface 50a and is oriented generally at right angles relative thereto. When insert 51 is received in bore 12d of lower tubular member 12, bore 51a may be aligned with aperture 40f defined in base 40. A bolt 52 may secure retaining device 16 to lower tubular member 12 of shaft 9. Bolt 52 may include a head 52a and a shaft 52b. Shaft 52b may be inserted through aligned aperture 40f in base 40 and hole 50a in insert 50. A coil spring 54 may be provided around an end region of shaft 52b where that region extends upwardly beyond upper surface 50b of insert 50. A washer 56 and nut 58 may be engaged with the tip of shaft 52b so that bolt 52 cannot be withdrawn from its engagement with retaining device 16 and lower tubular member 12. Spring 54 may keep head 52a of bolt 52 in close contact with lower surface 40b of base 40.

A protective member 53 (FIG. 5) may be provided to cover head 52a of bolt. Protective member 53 may comprise a felt pad positioned over bolt head 52a and a region of lower surface 40b that surrounds bolt head 52a. An adhesive layer 53a may be provided to secure protective member 53 to lower surface 40b of retaining device 40 and head 52a. Alternatively, protective member 53 may be fabricated from a more durable material, such as a plastic, and be of a type that may tend to grip surface "S" upon which stand 10 rests. Protective member 53 may serve a number of purposes. Firstly, protective member 53 may prevent stand 10 from damaging surface "S" and may prevent surface "S" from damaging retaining device 16 because protective member 53 keeps the retaining device 16 a distance away from surface "S". Secondly, protective member 53 may be of a thickness that is sufficient that when retaining device 40 and legs 26 rest on surface "S", the protective member 53 may be oriented generally in the same plane as boots 26c on legs 26c. Thus, stand 10 may be supported not only by the three legs 26 but additionally by retaining device 16. This feature may provide additional stability to stand 10 relative to a condition where only legs 26 rest on surface "S". Thirdly, when stand 10 is used as a monopod and the leg assembly 14 is therefore in a collapsed position, protective member 53 may provide some traction on surface "S" and aid in preventing stand 10 from sliding along surface "S" and potentially sliding out from under stand 10.

Retaining device 16 may define three retaining pockets 46 (FIG. 3) therein that are each configured to selectively receive a bottom end 26b of one of legs 26 therein when retaining device 16 is engaged to lock stand 10 in a monopod condition. When retaining device 16 is disengaged to permit stand 10 to automatically function as a tripod, bottom ends 26b of legs 26 are no longer retained within the associated retaining pockets 46. Each retaining pocket 46 comprises a space that is bounded and defined by a portion of upper surface 40a of base 40, one of the generally L-shaped regions of wall 42 and a portion of side wall 48c of bottom section 48 of insert 51 (FIG. 5). The bottom end 26b of a leg is received between the generally L-shaped region of wall 42 and the portion of side wall 48c of insert 51. In each of the generally L-shaped regions, the first section 42a of the wall 42 may include a barb 42a that is shaped and sized to retain a bottom end 28b of one of the legs 26 secure in its associated retaining pocket 46. Barb 42a may curve slightly inwardly into an associated retaining pocket 46.

Retaining device 16 may be selectively rotatable about longitudinal axis "Y" in the direction indicated by arrow "D" (FIG. 7B) or in a direction opposite to arrow "D". When retaining device 16 is rotated in the direction "D", the bottom ends 26b of legs 26 are each captured in one of the retaining pockets 46 and therefore stand 10 is locked in the monopod position. When retaining device 6 is rotated in the opposite direction to arrow "D", the bottom ends 26b of legs 26 are released from retaining pockets 46 and the stand is free to automatically move between the extended and collapsed positions as a tripod.

Figure 7A:
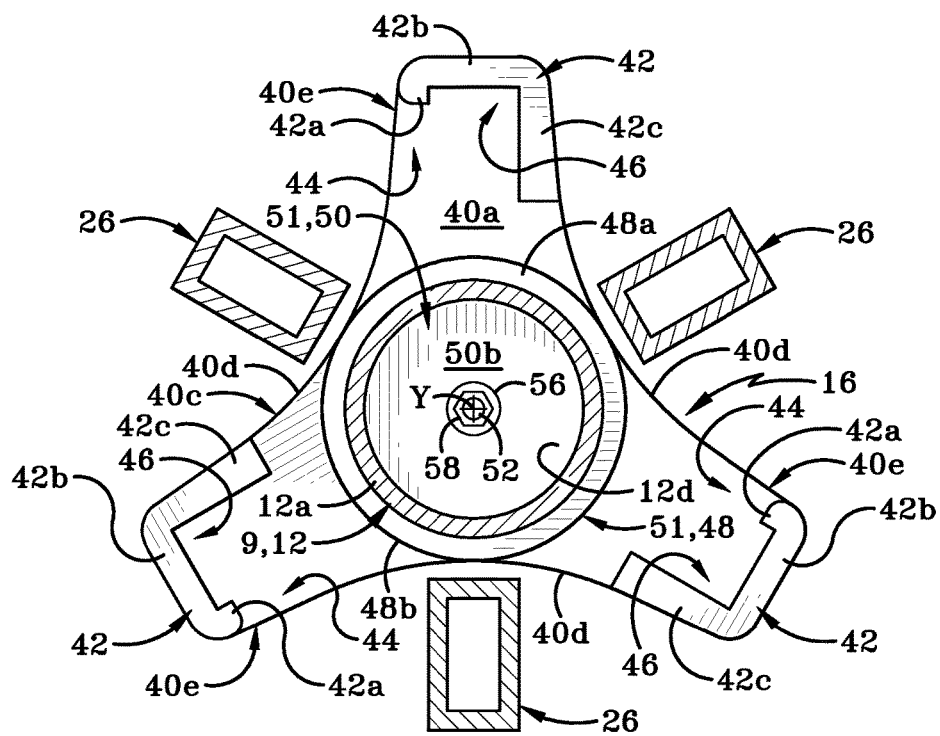
FIG. 7A is a top view taken along line 7A-7A of FIG. 6 showing the legs of the leg assembly in the collapsed position and out of engagement with the retaining device, where the retaining device is in the disengaged position.
Figure 7B:
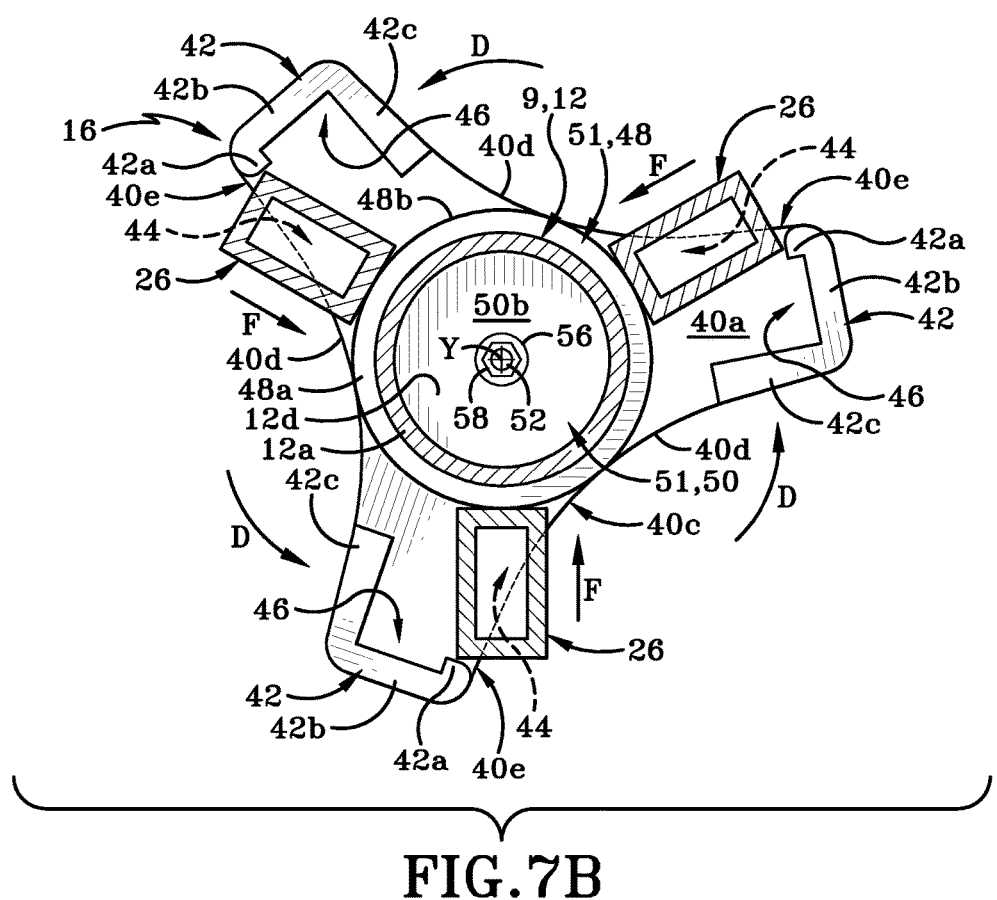
FIG. 7B is a top view taken along line 7A-7A of FIG. 6 showing the retaining device being rotated in a first direction and showing the legs of the leg assembly entering into retaining pockets provided on the retaining device.
Figure 7C:
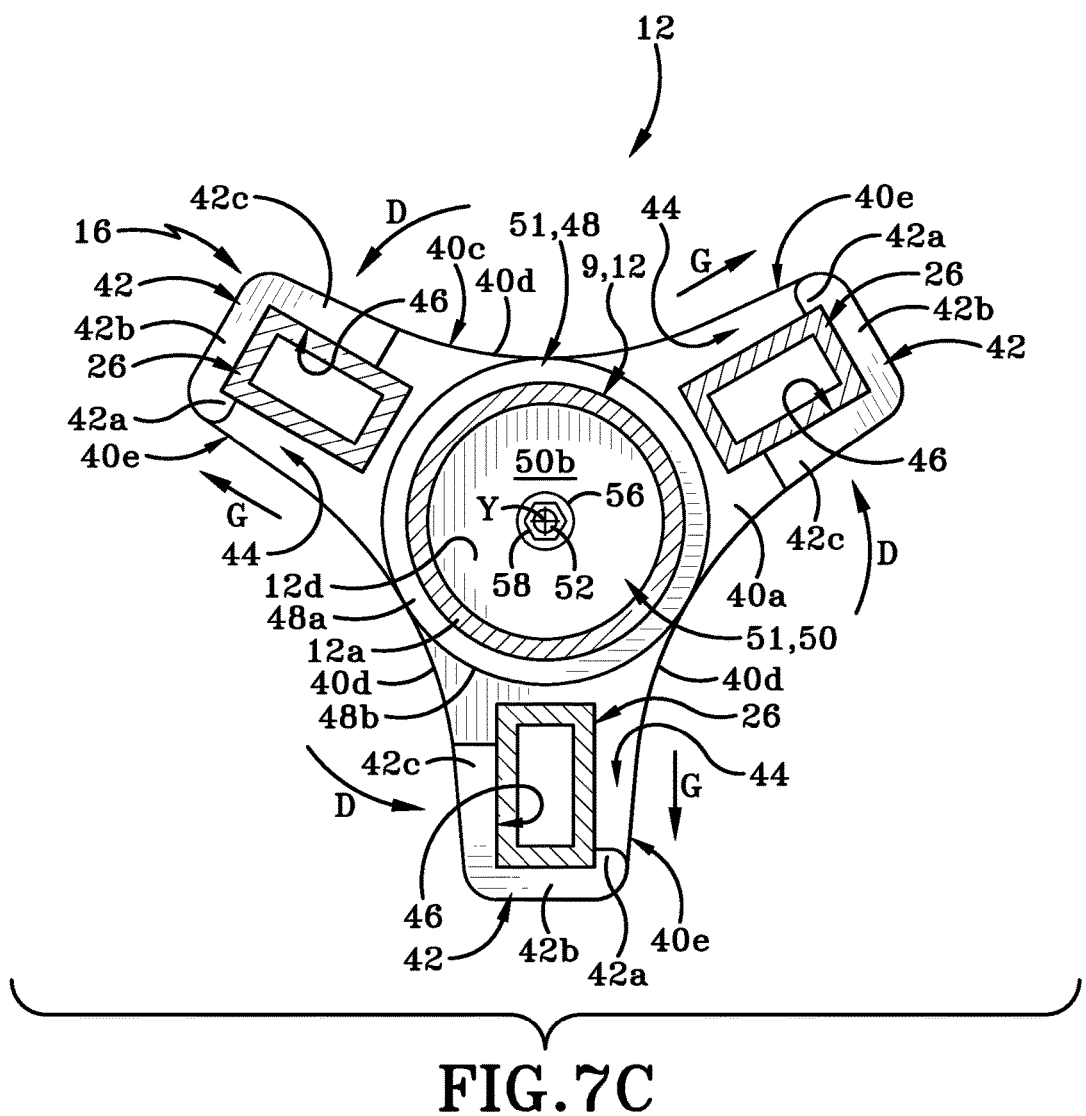
FIG. 7C is a top view taken along line 7A-7A of FIG. 6 showing the retaining device in the engaged position and showing each of the legs of the leg assembly seated within its own retaining pocket of the retaining device.

FIGS. 7A to 7C show how retaining device 16 is used to lock leg assembly 14 in the collapsed position. This is accomplished by capturing the ends 26b, 26c of legs 26 within the retaining pockets 46 defined in retaining device 16. FIGS. 6 and 7A show leg assembly 14 in the collapsed position but without legs 26 engaged in retaining device. In this initial position, each leg 26 is positioned in one of the scalloped regions 40d of retaining device 16.

FIG. 7B shows retaining device 16 being rotated in the direction of arrow "D". As rotation is initiated, each leg 26 will contact one of the arms 40e on base 40 and start to slide along the curved peripheral edge 40c of base 40. The sliding motion along peripheral edge 40c tends to move the end of each leg 26 inwardly towards the central lower section 48 as indicated by arrows "F". The inward movement causes the second end of each leg 26 to slide into one of the retaining pockets 46 defined in retaining device 16.

Figure 8:
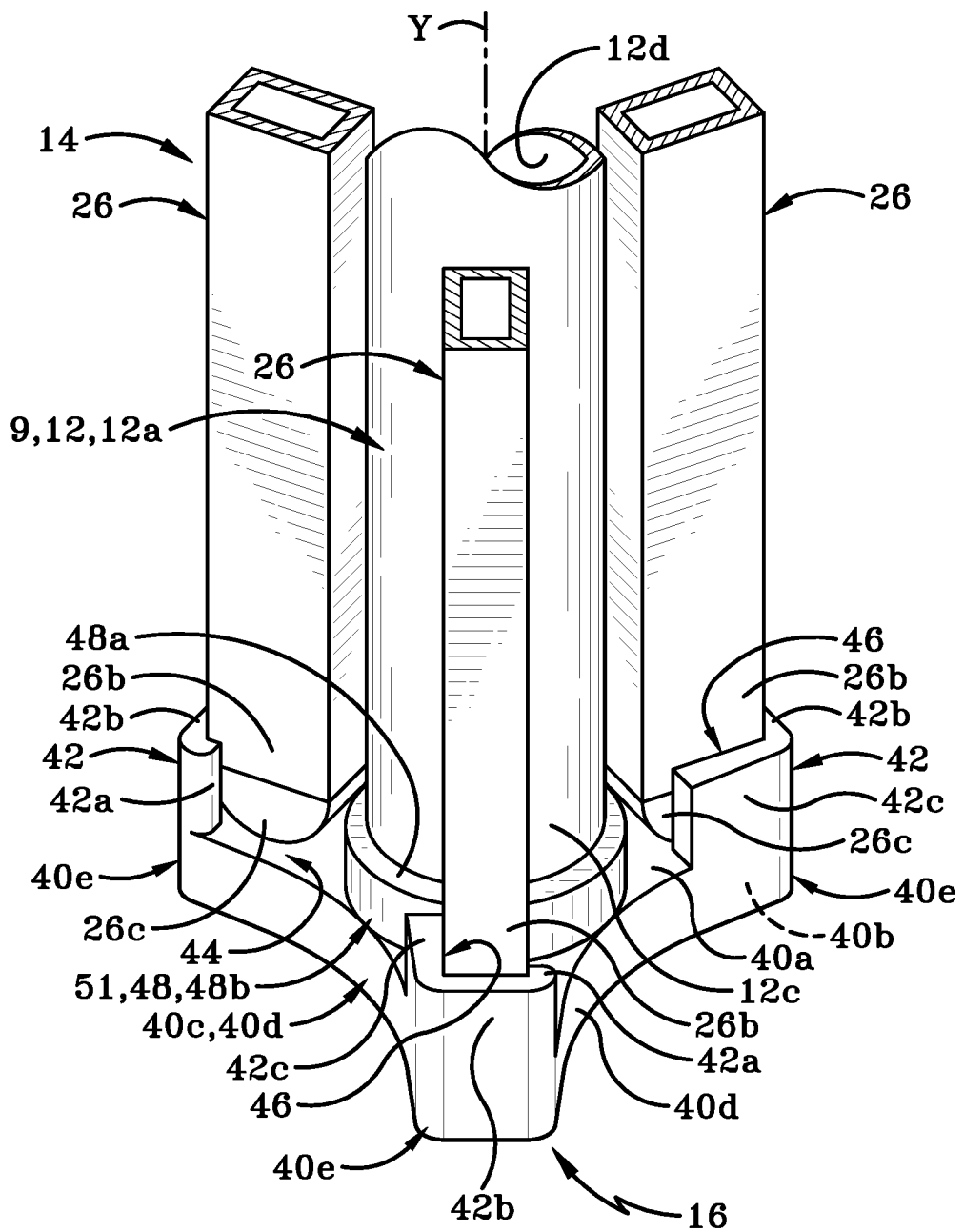
FIG. 8 is an isometric perspective view of a bottom end of the shaft with the retaining device in the engaged position and showing the legs of the leg assembly each seated within a retaining pocket of the retaining device, and the stand in the monopod position.

As the bottom end of each leg 26 clears the barb 42a on wall 42, the leg 26 tends to move outwardly once again in the direction of arrow "G" (FIG. 7C) and become captured in the associated one of the retaining pockets 46 defined in retaining device 16. Barbs 42a help retain legs 26 in retaining pockets 46 of retaining device 16. FIG. 8 shows all three legs 26 captured and restrained by retaining device 16. Consequently, leg assembly 14 is locked against moving from the collapsed position to the extended position by retaining device 16. In this position, stand 10 may now be effectively used as a monopod and there is little to no possibility of the leg assembly 14 inadvertently moving to the extended position. Barbs 42a ensure that legs 26 will not accidentally slide out of the associated retaining pocket 46. It will be understood that in order for stand 10 to be moved back from the monopod position to the tripod position, the steps described and illustrated with respect to FIGS. 7A-7C will simply be reversed.

As indicated above, in order for stand 10 to be usable as a dual function stand, (i.e., monopod and tripod) the photographer requires a means to select whether to use stand 10 as a monopod or as a tripod. In the illustrated embodiment of the invention, retaining device 16 performs this function in that it acts as a holding mechanism that captures and retains legs 26 in the collapsed or closed position. It will be understood, however, that any other suitable means of selecting whether to use the stand 10 as a monopod or tripod may be utilized. For example, instead of retaining device 16, stand 10 may be provided with a latch, a spring, a clamp or any other suitable holding means for capturing and holding legs 26 adjacent shaft 9 when stand 10 is to be used as a monopod. When that holding means is selectively released, then leg assembly 14 will automatically move to the open position when stand 10 is placed on the support surface. The purpose of the holding means (i.e., retaining device 16 or any other provided latch, spring, clamp or catch) is to retain legs 26 and keep them from operating until the photographer selects to do so. In other words, the default position of the leg assembly 14 is the extended position. The user has to purposely select to move the legs into the collapsed position by engaging the retaining device or other holding device.

Referring to FIGS. 10A-10C, the automatic opening of the legs 26 is illustrated. FIG. 10A shows legs 26 in the collapsed position and retained adjacent to and substantially parallel to shaft 9, particularly to the exterior surface of peripheral walls 11a, 12a. As described above but not illustrated in these figures, retaining device 16 is moved to a disengaged position, where the ends of legs 26 are released from retaining pockets on retaining device 26, i.e., to the position shown in FIG. 7A. If stand 10 is then put down onto the support surface "S" in the collapsed but not locked position, as soon as retaining device 16 of stand 10 touches surface "S", stand 10 will automatically turn into a tripod because leg assembly 14 automatically moves to the extended position. This automatic opening of leg assembly 14 is accomplished as follows. When retaining device 16 touches surface "S", the weight of upper tubular member 11 works with the force of gravity and causes upper tubular member 11 to slide downwardly and inwardly into bore 12d of lower tubular member 12 in the direction indicated by arrow "I" (FIG. 10B). Because of the alignment of the pivot points in the connectors 32 to the pivot points in the legs 26, as described previously herein, the downward force is translated to horizontal force acting on the legs 26, causing the legs 26 to begin to spread outwardly away from each other in the opposite direction to arrow "B" (FIG. 6). This automatic spreading of legs 26 continues until the legs 26 reach their fully extended position shown in FIG. 10C and FIG. 1 The photographer can then use stand 10 in a tripod mode.

If the photographer later decides to lift the tripod stand 10 off surface "S", stand 10 is configured so that it will automatically move to the collapsed position as soon as it is picked up. This is illustrated in FIGS. 11A-11C and is described further herein. Initially, stand 10 is in the position shown in FIG. 11A. When the operator grasps upper tubular member 11 in order to lift stand 10 off surface "S", the force to carry the device vertically causes a portion of upper tubular member 11 to slide vertically outwardly out of bore 12d of lower tubular member 12. The vertical upward movement of upper tubular member 11 in the direction indicated by arrow "L" (FIG. 11B) causes legs 26 to pivot inwardly in the direction of arrow "B" (FIG. 6) towards each other and towards lower tubular member 12 of shaft 9 (FIG. 11B). Upper tubular member 11 continues to slide out of bore 12d until legs 26 are oriented substantially parallel to peripheral wall 12a of lower tubular member 12 (FIGS. 11C and 9). It should be noted that lower tubular member 12 may be of a sufficient weight that it may remain in contact with surface "S" until connecting links 32 have reached their full vertical position. Once connecting links are at their full vertical position, the entire shaft 9 will move as a unit and lift off the surface "S".

While stand 10 in FIG. 11C has been moved to the collapsed position, retaining device 16 is not yet engaged. Consequently, if stand 10 is placed onto a support surface at a different location, the stand 10 will automatically moved to a tripod position. If it is desired to use stand 10 as a monopod, then retaining member 16 has to be rotated into the opposite direction to arrow "D" to capture and retain bottom ends 26b of legs 26 therein.

FIG. 9 shows stand 10 with retaining device 16 securing leg assembly 14 in the collapsed position. Stand 10 rests on retaining device 16 and protective member 53 on surface "S". This figure also illustrates upper tubular member 11 and thereby shaft 9 being adjusted in length by moving sections 11e, 11f and 11g upwardly and outwardly in the direction of arrow "H" relative to upper end 11b of upper tubular member 12. Camera 60 is engaged with connector 18 and is ready for use. To reduce the length of shaft 9, sections 11e, 11f and 11g are pushed downwardly so that they move in the opposite direction to arrow "H" and towards upper end 11b of upper tubular member 11.

A method of utilizing stand 10 to support a piece of equipment such as a camera 60 on surface "S" may comprise steps of selecting to use stand 10 in a monopod position (FIG. 9) or in a tripod position (FIG. 1); placing a lower end of the stand 10 in a first location on the support surface "S" when the step of selecting comprises selecting to use the stand in the tripod position; and automatically moving a leg assembly 14 on stand 10 to an open position when the stand is placed on the support surface "S". The step of automatically moving leg assembly 14 may include moving an upper tubular member 11 on a shaft 9 of the stand 10 downwardly into a bore 12d of a lower tubular member 12 on the shaft 9 under the influence of gravity (arrow "I" in FIG. 10B). The method may further comprise selecting to move the stand to a second location on the support surface "S", lifting the stand off the support surface "S" in the direction of arrow "L" (FIG. 11B); and automatically moving the leg assembly 14 to a closed position such as is shown in FIG. 11C. The step of automatically moving leg assembly 14 to the closed position comprises sliding the lower tubular member 12 of the shaft downwardly in the direction of arrow "M" (FIG. 11C) relative to upper tubular member 11 under the influence of gravity as the stand 10 is lifted off the support surface "S".

The step of selecting in the method may further comprise selecting to use the stand 10 in the monopod position (FIG. 9) and then the method may further comprise moving leg assembly 14 from the open position (FIG. 11A) to a closed position (FIG. 11C); and locking leg assembly 14 in a closed position (FIG. 6) using a retaining device 16. The step of locking leg assembly 14 comprises rotating the retaining device 16 about a longitudinal axis "Y" of a shaft 9 of stand 10 in a first direction "D" (FIG. 7B) to capture legs 26 of leg assembly 14 in retaining ports defined in the retaining device 16.

The method may further comprise selecting to use the stand in the tripod position (FIG. 1), rotating the retaining device 16 about the longitudinal axis "Y" in a second direction opposite to direction "D" (FIG. 7B); releasing the leg assembly 14 from the retaining device 16; placing a bottom end of the stand 10 on the support surface "S"; and automatically moving the leg assembly to the open position (FIGS. 10A to FIG. 10C) under the influence of gravity.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A stand for supporting equipment in a stable position above a surface, said stand being movable between a first position and a second position; and when the stand is in the first position the stand makes contact with the surface at more than one contact point; and when the stand is in the second position the stand makes contact with the surface at only one contact point; wherein the stand is automatically moveable to the first position when placed in contact with the surface; and a retaining device is provided on the stand, wherein the retaining device is movable between an engaged position and a disengaged position, and when in the engaged position, the retaining device prevents the stand from moving to the first position.

2. The stand as defined in claim 1, wherein the stand is a tripod when in the first position and is a monopod when in the second position; and when the stand is the tripod, the ends of the stand's three legs contact the surface at three contact points; and when the retaining device is engaged, the three legs are prevented from moving apart from each other.

3. The stand as defined in claim 2, wherein the retaining device is disengaged to move the stand from the second position to the first position; and
when the retaining device is disengaged as the stand is lifted from the surface; the three legs automatically move towards each other.

4. The stand as defined in claim 3, wherein the retaining device is movable between a first position and a second position; and when the retaining device is in the first position, ends of the three legs are not captured in retaining pockets defined in the retaining device; and when the retaining device is in the second position, the ends of the three legs are captured in the retaining pockets defined in the retaining device.

5. The stand as defined in claim 4, wherein stand comprises a shaft and the legs are pivotally engaged with the shaft; and wherein the retaining device is provided on one end of the shaft; and the retaining device is rotatable about a longitudinal axis of the shaft in a first direction to move the retaining device into the first position; and the retaining device is rotatable about the longitudinal axis in a second direction to move the retaining device into the second position.

6. A stand for supporting equipment in a stable position above a surface, wherein the stand comprises:
a shaft having a first end and a second end;
a connector provided on the first end, said connector being adapted to engage the equipment that is to be supported on the stand;
a retaining device provided at the second end of the shaft;
a leg assembly engaged with the shaft in a position intermediate the first end and the second end; wherein the leg assembly includes at least one leg that has a top end and a bottom end; and the top end of the at least one leg is pivotally engaged with the shaft; wherein the at least one leg is movable between a first position where the at least one leg is oriented at an angle to the shaft; and a second position where the at least one leg is oriented generally parallel to the shaft; and
wherein the at least one leg is selectively engaged by the retaining device when the at least one leg is in the second position.

7. The stand as defined in claim 6, wherein the leg assembly is automatically movable between the first position and the second position when the at least one leg is not engaged by the retaining device.

8. The stand as defined in claim 6, wherein the retaining device comprises a base and at least one retaining pocket is provided on the base; and
wherein the bottom end of the at least leg is captured in the at least one retaining pocket when the at least one leg is selectively engaged by the retaining device.

9. The stand as defined in claim 8, wherein the at least one retaining pocket comprises a wall extending upwardly from the base and wherein a gap is defined in the wall; and wherein the gap is sized to receive the bottom end of the at least one leg therethrough.

10. The stand as defined in claim 9, further comprising a barb provided on a region of the wall that is adjacent the gap, wherein the barb prevents the bottom end of the at least one leg from accidentally exiting from the at least one retaining pocket.

11. The stand as defined in claim 9, wherein the leg assembly includes three pivotable legs and wherein the base of the retaining device includes three arms and three retaining pockets and wherein each of the three retaining pockets is provided on one of the three arms; and wherein the three arms extend radially outwardly from a central region of the base.; and wherein the three arms are spaced equidistantly from each other and are oriented generally at an angle of about 120° relative to each other.

12. The stand as defined in claim 6, wherein the shaft comprises:
an upper tubular member having an upper end and a lower end; wherein the at least one leg is operatively pivotally engaged with the upper tubular member;
a lower tubular member having an upper end and a lower end; said lower tubular member defining a bore therein, wherein the lower end of the upper tubular member is received within the bore and the upper tubular member is selectively movable toward the lower end of the lower tubular member or movable away from the lower end of the lower tubular member; and
a connecting link having a first end operatively pivotally engaged with the lower tubular member and having a second end pivotally engaged with the at least one leg.

13. The stand as defined in claim 12, wherein the at least one leg is operatively pivotally engaged with the upper tubular member by a first pivot pin and the at least one leg is selectively rotatable about a first pivot axis extending along the first pivot pin;
wherein the first end of the connecting link is operatively pivotally engaged with the lower tubular member by a second pivot pin and the connecting link is selectively rotatable about a second pivot axis extending along the second pivot pin; and
wherein the second end of the connecting link is operatively pivotally engaged with the at least one leg by a third pivot pin and the connecting link is selectively rotatable about a third pivot axis extending along the third pivot pin.

14. The stand as defined in claim 13, wherein the third pivot axis is offset relative to the first pivot axis and the second pivot axis when the at least one leg is in the second position.

15. The stand as defined in claim 6, wherein the at least one leg is biased into the first position.

16. A method of utilizing a stand to support a piece of equipment on a support surface, said method comprising steps of:
selecting to use the stand in a tripod position or a monopod position;
placing a lower end of the stand in a first location on the support surface when the step of selecting comprises selecting to use the stand in the tripod position; and
automatically moving a leg assembly on the stand to an open position when the stand is placed on the support surface.

17. The method as defined in claim 16, wherein the step of automatically moving the leg assembly includes moving an upper tubular member on a shaft of the stand downwardly into a bore of a lower tubular member on the shaft under an influence of gravity.

18. The method as defined in claim 17, further comprising:
selecting to move the stand to a second location on the support surface;
lifting the stand off the support surface; and
automatically moving the leg assembly to a closed position.

19. The method as defined in claim 18, wherein the step of automatically moving the leg assembly to the closed position comprises sliding the lower tubular member of the shaft downwardly relative to the upper tubular member under the influence of gravity as the stand is lifted off the support surface.

20. The method as defined in claim 16, wherein the step of selecting comprises selecting to use the stand in the monopod position; and the method further comprises:
moving the leg assembly from the open position to a closed position; and
locking the leg assembly in a closed position using a retaining device.

21. The method as defined in claim 20, wherein the step of locking the leg assembly comprises rotating the retaining device about a longitudinal axis of a shaft of the stand in a first direction and capturing ends of legs of the leg assembly in retaining pockets defined in the retaining device.

22. The method as defined in claim 21, further comprising:
selecting to use the stand in the tripod position;
rotating the retaining device about the longitudinal axis in a second direction;
releasing the leg assembly from the retaining device;
placing the stand on the support surface; and
automatically moving the leg assembly to the open position under the influence of gravity.

* * * * *